US009590962B2

(12) United States Patent
Mizikovsky et al.

(10) Patent No.: US 9,590,962 B2
(45) Date of Patent: Mar. 7, 2017

(54) USING COOKIES TO IDENTIFY SECURITY CONTEXTS FOR CONNECTIONLESS SERVICE

(71) Applicant: Alcatel-Lucent USA Inc., Murray Hill, NJ (US)

(72) Inventors: Semyon B. Mizikovsky, Murray Hill, NJ (US); Suresh P. Nair, Murray Hill, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 171 days.

(21) Appl. No.: 14/324,811

(22) Filed: Jul. 7, 2014

(65) Prior Publication Data
US 2016/0006726 A1 Jan. 7, 2016

(51) Int. Cl.
*H04L 29/06* (2006.01)
*H04L 9/32* (2006.01)
*H04W 12/06* (2009.01)

(52) U.S. Cl.
CPC ........ *H04L 63/061* (2013.01); *H04L 63/0807* (2013.01); *H04W 12/06* (2013.01)

(58) Field of Classification Search
CPC ............. H04L 63/0853; H04L 63/0435; H04L 63/061; H04W 12/04
USPC ........................................................ 713/171
See application file for complete search history.

(56) References Cited

U.S. PATENT DOCUMENTS 8,515,436 B2 * 8/2013 Song ................... H04W 76/068
455/410
2007/0154017 A1 * 7/2007 Yun ................... H04W 36/0038
380/270
2010/0054472 A1 * 3/2010 Barany ............... H04L 63/0428
380/270
2012/0005476 A1 * 1/2012 Wei ..................... H04L 63/0272
713/153
2012/0213140 A1 * 8/2012 Olsson .................... H04W 8/08
370/311
2013/0044708 A1 * 2/2013 Kim ........................ H04W 4/06
370/329
2013/0301611 A1 * 11/2013 Baghel .................. H04W 72/04
370/331
2014/0059662 A1 * 2/2014 Zhu ....................... H04L 9/3271
726/6
2014/0179325 A1 * 6/2014 Xu .................... H04W 36/0055
455/437

(Continued)

OTHER PUBLICATIONS

"3rd Generation Partnership Project; Technical Specification Group Services and System Aspects; Study on Machine-Type Communications (MTC) and other mobile data applications communications enhancements (Release12)", 3 GPP TR 23.887 v 12.0.0, Dec. 2013, 151 pages.

(Continued)

*Primary Examiner* — Dede Zecher
*Assistant Examiner* — Abdullah Almamun
(74) *Attorney, Agent, or Firm* — Davidson Sheehan LLP

(57) ABSTRACT

A mobility management entity (MME) receives a request for a key to establish a security context for communication between a base station and a user equipment in response to the user equipment requesting connectionless service with the base station. In response to receiving the request, the MME transmits a cookie to identify the security context stored by the base station.

31 Claims, 6 Drawing Sheets

(56) References Cited

U.S. PATENT DOCUMENTS

2014/0241317 A1* 8/2014 Jamadagni .......... H04W 76/025
370/331
2015/0365852 A1* 12/2015 Xu .................... H04W 36/0027
370/331

OTHER PUBLICATIONS

"pCR to TR 33.868: MTCe Connectionless Solution: Enhancements", 3 GPP TSG SA WG3 (Security) Meeting #72, Jul. 8, 2013, 6 pages.
"pCR to TR 33.868: MTCe Connectionless Solution: Evaluation Changes", 3 GPP TSG SA WG3 (Security) Meeting #72, Jul. 8, 2013, 1 page.
"pCR to TR 33.868: MTCe Connectionless Solution: Enhancements (Threat Scenarios)", 3 GPP TSG SA WG3 (Security) Meeting #72, Jul. 8, 2013, 2 pages.
"pCR to TR 33.868: MTCe Connectionless Solution: Security Solution", 3 GPP TSG SA WG3 (Security) Meeting #71, Apr. 8, 2013, 5 pages.

* cited by examiner

USING COOKIES TO IDENTIFY SECURITY CONTEXTS FOR CONNECTIONLESS SERVICE

BACKGROUND

Field of the Disclosure

The present disclosure relates generally to wireless communication systems and, more particularly, providing connectionless service in wireless communication systems.

Description of the Related Art

User equipment can transmit messages of varying sizes over an air interface to a base station in a wireless communication system. For example, user equipment that are configured for machine-type-communication may transmit messages ranging in size from several packets down to a single packet. In order to transmit messages over the air interface, an idle user equipment is typically required to transition to an active state and send a service request to the network, which triggers configuration of a security context for the communication session between the base station and the user equipment so that the messages can be securely communicated over the air interface. For example, the idle user equipment may transition to the active state and send a service request to a mobility management entity (MME) in the network via a base station. The MME and the active user equipment may then perform an authorization and authentication procedure with the assistance of the Home Subscription System (HSS) to authenticate subscription credentials that were previously securely placed in the Universal Subscriber Identity Module (USIM) of the user equipment.

Successful authentication of the user equipment results in computation (at the user equipment and at the HSS for provision to the MME) of a shared secret key ($K_{ASME}$) that can be used to generate one or more security keys that form a Non-Access Stratum (NAS) security context for the active user equipment. The $K_{ASME}$ can be also used to generate an Access Stratum (AS) security context for the user equipment and the base station. For example, the user equipment can generate a security key ($K_{eNB}$) using its copy of the $K_{ASME}$ and the MME can use its copy of the $K_{ASME}$ to provide a copy of the security key ($K_{eNB}$) to the base station. The user equipment and the base station may use their respective copies of the security key ($K_{eNB}$) to negotiate the AS security context, which may include one or more subordinate keys to support secure communications over the air interface by providing radio resource control (RRC) encryption and integrity and user plane encryption and integrity.

When communication over the air interface is complete, the user equipment returns to the idle state. The base station deletes information identifying the user equipment (such as a temporary mobile subscriber identity, TMSI) and the AS security context that was used to support secure communication with the base station. During the active communication mode under protection of the NAS security context, the MME may allocate a different temporary identifier (such as a new value of the TMSI) to the user equipment for each subsequent request. Thus, once the user equipment has transitioned back to the idle state, the base station is not able to recognize that a subsequent request is being received from the user equipment that previously established the AS security context with the base station. The MME and the user equipment retain the NAS security context, which can be used to reestablish the AS security context when the user equipment subsequently awakes to begin a new communication session over the air interface with the base station. Consequently, the idle user equipment must repeat the service request procedure to the MME to reestablish the AS security context each time it wants to send information over the air interface.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
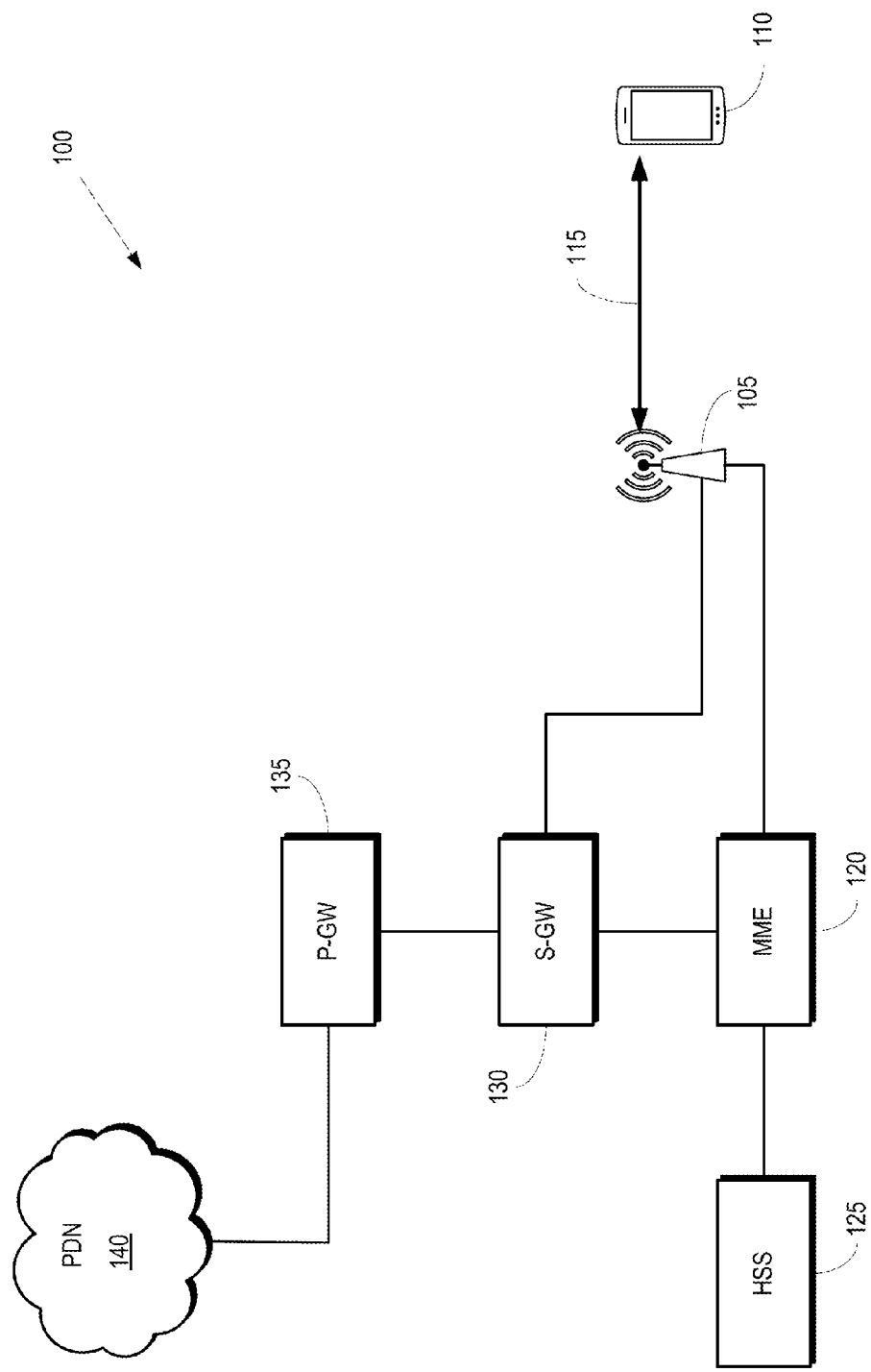
FIG. 1 is a block diagram of a first example of a wireless communication system according to some embodiments.

The overhead required to re-establish a security context is negligible compared to the resources consumed by larger transmissions. However, in the case of smaller messages, the overhead may be comparable to or larger than the resources needed to transmit occasional small messages. To support secure transmission of occasional small messages from idle user equipment without incurring a large signaling overhead, and without unnecessarily involving the MME, the base stations and the user equipment can be configured to store AS security contexts so that an idle user equipment can transmit small messages in the user plane by using the existing AS security context without transitioning to the active state or re-establishing a new AS security context. Transmitting data from an idle user equipment in the user plane using an existing AS security context may be referred to as "connectionless" data transmission. The base station allocates a token that identifies the cached AS security context and delivers a copy of the token to the user equipment when the AS security context is established. Idle user equipment can then begin connectionless data transmission by sending a request that includes the token to identify the appropriate cached AS security context, which may also be used to integrity protect the request.

User equipment that are accessing a base station for the first time and have not established an AS security context with the base station can request connectionless data transmission by sending a request for connectionless service that does not include a token that identifies a pre-existing security context. When the base station receives a request for connectionless service that does not include a token, the base station uses the conventional authorization/authentication procedure to establish an AS security context for the user equipment. For example, the base station may request a security key from the MME, negotiate an AS security context with the user equipment on the basis of the security key, allocate a token that uniquely identifies the AS security context, and transmit the token associated with the AS security context to the user equipment. Both the base station and the user equipment may then store the token and the associated AS security context. After subsequently reentering the idle state, the user equipment can initiate connectionless service by transmitting a request that includes the token. The base station can then identify the previously stored AS security context using the token so that connectionless messages can be transmitted securely over the air interface.

Connectionless data transmission using tokens may be vulnerable to various security threats. For example, base stations are not able to uniquely identify idle user equipment that request connectionless service because the base stations are required to delete the information identifying user equipment (such as the TMSI) that previously communicated with the base station when the user equipment enters the idle state. Moreover, base stations typically do not know the permanent identity of the user equipment, such as the user equipment's international mobile subscriber identity (IMSI). Base stations assign a temporary identification number (such as a cell radio network temporary identity, C-RNTI) to user equipment to identify an active connection between the user equipment and the base station for the duration of the active connection. However, after the active connection is terminated and the user equipment returns to the idle state, the base station may allocate the same C-RNTI to another user equipment for another active connection. The base station is therefore unable to distinguish between multiple requests sent by multiple user equipment and multiple requests sent by a single user equipment. The base station simply transmits a new request to the MME for a security key used to negotiate an AS security context in response to each tokenless request for connectionless service.

Unscrupulous users may therefore start a denial-of-service-type attack on a base station's resources by repeatedly transmitting requests for connectionless service that do not include the tokens that are returned by the base station in response to each request. The accumulation of dummy AS security contexts in the base station eventually exhausts the resources of the base station.

Denial-of-service-type attacks can be thwarted by providing a context identifier such as a context cookie (hereinafter, "cookie") that identifies a currently active NAS security context that is used by the MME for generating the AS security context for user equipment when a base station requests a new AS security context in response to a request from the user equipment to initiate connectionless service. The cookie may be derived from or otherwise be uniquely associated with the permanent identity of the user equipment, but the cookie is not the same as the actual permanent user identity (e.g., the IMSI) to preserve end-to-end user identity protection and privacy in the wireless communication system. Some embodiments of the base station may transmit a request for a new security context to an MME in response to a request for connectionless service that does not include a token to identify a previously stored security context. Even though the user equipment identifies itself to the base station using a temporary identifier such as a TMSI, the MME can uniquely identify the user equipment's permanent identity (e.g., using the IMSI stored by the MME), which allows the MME to determine whether a NAS security context has already been generated for the user equipment. In one embodiment, the MME can also determine whether a security context including a copy of the security key ($K_{eNB}$) has been provided to the base station to negotiate an AS security context with the user equipment. If not, the MME returns a newly allocated cookie and a newly generated security context that includes a security key that can be used by the base station to generate an AS security context, which can be associated with a token and used to establish secure connectionless service with user equipment.

If the MME determines that a security context has already been provided to the base station, the MME returns the previously allocated cookie to identify the AS security context that was previously generated for the base station using the previously provided security key. The base station can use the returned cookie to identify the AS security context and establish secure connectionless service with the user equipment on the basis of the previously stored AS security context and its associated token. In another embodiment, the MME may blindly provide the cookie associated either with the user equipment or with an existing NAS security context, and allow the base station determine if the AS context for the user equipment already exists at the base station. If the AS security context associated with the provided cookie already exists at the base station, the base station uses the cached AS security context and provides the related token to the user equipment. In either case, an unnecessary new AS security context is not created in the base station and malicious user equipment is not be able to deplete the resources of the base station more than the amount of resources that may be allocated to any legitimate user equipment, thereby thwarting the denial of service attack.

Some embodiments of the MME may optionally return a new security key that can be used to generate a new AS security context that can be identified by the previously allocated cookie. In that case, the base station may purge the previous AS security context and store the new AS security context (with an associated token) for establishing the secure connectionless service with the user equipment.

FIG. 1 is a block diagram of a first example of a wireless communication system 100 according to some embodiments. The wireless communication system 100 includes one or more base stations 105 that are used to provide wireless connectivity to one or more user equipment 110 over an air interface 115. The base stations 105 may also be referred to as eNodeBs, eNBs, access points, cells, macrocells, microcells, femtocells, and the like. The user equipment 110 may include relatively mobile devices such as cellular phones, smart phones, tablet computers, and laptop computers, as well as relatively immobile devices such as desktop computers that are capable of wireless communication over the air interface 115. The base station 105 and the user equipment 110 may communicate according to standards such as the Long Term Evolution (LTE) standard established by the Third Generation Partnership Project (3GPP).

The wireless communication system 100 also includes one or more mobility management entities (MMEs) 120. Some embodiments of the MME 120 may function as a control-node for the wireless communication system 100 and may be responsible for paging user equipment 110 when the user equipment 110 is in the idle state and supporting the bearer activation/deactivation process. The MME 120 may also be responsible for authenticating the user equipment 110 by interacting with the Home Subscriber Server (HSS) 125, which maintains a database that contains user-related and subscription-related information such as security keys used to establish secure associations between the user equipment 110 and the MME 120. Some embodiments of the MME 120 may also terminate Non-Access Stratum (NAS)

signaling. As used herein, the term "non-access stratum" refers to a functional layer between a core network of the wireless communication system 100 and the user equipment 110. The non-access stratum layer is used to establish communication systems and maintain continuous communication with the user equipment 110 as it moves through the wireless communication system 100. The non-access stratum may be contrasted to the "access stratum," which is responsible for conveying information over the air interface 115. Some embodiments of the MME 120 may be responsible for generation and allocation of temporary identities to the user equipment 110. Some embodiments of the MME 120 may also be a termination point in the wireless communication system 100 for ciphering/integrity protection for NAS signaling and may handle security key management.

A serving gateway (SGW) 130 may be used to route and forward user data packets and may also act as the mobility anchor for the user plane during inter-base station handovers. Some embodiments of the SGW 130 may terminate the downlink data path for the user equipment 110 when the user equipment 110 is in the idle state. The SGW 130 may also trigger paging of the idle user equipment 110 when downlink data arrives for the idle user equipment 110. A packet data network (PDN) gateway (PGW) 135 provides connectivity from the user equipment 110 to one or more external PDNs 140. The PGW 135 may perform policy enforcement, packet filtering, charging support, lawful interception, or packet screening.

As discussed herein, the user equipment 110 may request "connectionless" service from the base station 105 for connectionless data transmission while the user equipment 110 is in the idle state. In some embodiments, the request for connectionless service may not include a token and the absence of the token indicates that the request is the first (or initial) request for connectionless service with the base station 105. The base station 105 may then allocate a token that identifies a security context to be used for the connectionless service and deliver a copy of the token to the user equipment 110 when the security context is established. Idle user equipment 110 can then begin connectionless data transmission by sending a request that includes the token to identify the appropriate security context, which may also be used to integrity protect the request.

The base station 105 may avoid denial-of-service attacks using cookies that are provided by the MME 120 to indicate previously allocated security contexts for the user equipment 110. For example, a cookie may be provided to identify the security context for the user equipment 110 for each tokenless request for connectionless service. The base station 105 may then use the cookie to identify a previously negotiated security context for the user equipment 110 to prevent the user equipment 110 from establishing multiple "dummy" security contexts in the base station 105 by transmitting multiple token-less requests for connectionless service.

Figure 2:
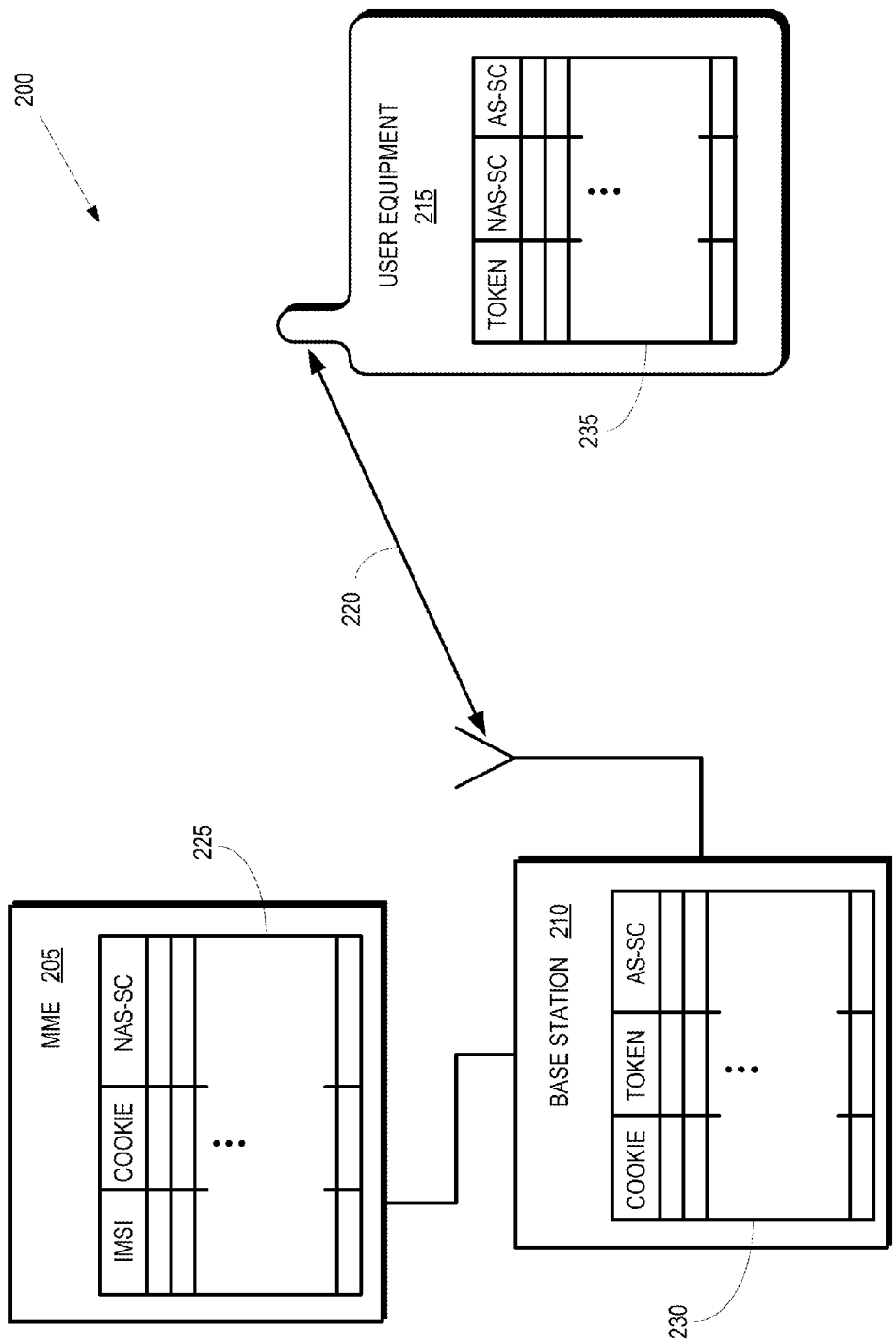
FIG. 2 is a second example of a wireless communication system according to some embodiments.

FIG. 2 is a second example of a wireless communication system 200 according to some embodiments. The wireless communication system 200 includes an MME 205 that is connected to a base station 210, which provides wireless connectivity to a user equipment 215 over an air interface 220. Some embodiments of the MME 205, the base station 210, or the user equipment 215 may be implemented as the MME 120, the base station 105, or the user equipment 110 shown in FIG. 1.

The MME 205 includes a data structure such as a table 225 that is used to store permanent identifiers and information associated with security contexts for user equipment such as the user equipment 215. For example, the table 225 may include an international mobile subscriber identifier (IMSI) that is a permanent identifier that uniquely identifies the user equipment 215 throughout the wireless communication system 200. The table 225 may also include a cookie that is allocated to the user equipment 215 when it establishes an NAS security context (NAS-SC) for the user equipment 215. Some embodiments of the cookie may be derived from the IMSI or associated with the IMSI of the user equipment 215. For example, the cookie may be a temporary identifier such as a temporary mobile subscriber identifier (TMSI) or a System Architecture Evolution (SAE) TMSI (S-TMSI) that is assigned by the MME 205 to the user equipment 215. The TMSI or S-TMSI is not changed by the MME 205 for the duration of the current NAS security context. For another example, the cookie may be derived from the user equipment's IMSI by the MME 205 using any MME-specific derivation method, such that even though the MME 205 derives the same value of cookie consistently for the same IMSI, reverse derivation of IMSI from the cookie is computationally infeasible. Examples of such derivation methods include a hash function, e.g. SHA, etc. For yet another example, the cookie may be assigned by the MME 205 as a random number or an opaque value in association with the current NAS security context and the cookie may be provided to the base station 210 with the $K_{eNB}$ security key when the base station 210 requests it. The random or opaque value of the cookie should remain consistent during the lifetime of the associated $K_{ASME}$. The NAS security context may be negotiated between the MME 205 and the user equipment 215 on the basis of a shared secret key (such as the $K_{ASME}$), which is known to the MME 205 and the user equipment 215, but is not known to the base station 210. The NAS security context may then be used to encrypt NAS messages transmitted between the MME 205 and the user equipment 215.

The base station 210 includes a data structure, such as a table 230, that is used to store cookies and tokens that are associated with security contexts shared by the base station 210 and the user equipment 215. Some embodiments of the base station 210 may negotiate an access stratum security context (AS-SC) with the user equipment 215 and then use the AS security context to encrypt messages sent over the air interface 220. The AS security context may be negotiated on the basis of a key that may be provided by the MME 205 as part of a security context transmitted to the base station 210. For example, the AS security context may be negotiated on the basis of a $K_{eNB}$ that is provided to the base station 210 by the MME 205 and which can also be independently computed by the user equipment 215. The MME 205 may also provide a cookie that is associated with the AS security context. The cookie can be used as an index to the AS security context in the table 230. The base station 210 can generate a token that is associated with the AS security context. The token can be used as an index to the AS security context in the table 230. The token may be provided to the user equipment 215.

Cookies and tokens typically are used for different purposes. For example, a cookie is derived from or otherwise uniquely associated with a permanent identity of the user equipment 215, or a current NAS security context, and is exchanged between MME 205 and the base station 210. The user equipment 215 is unaware of the cookie. In contrast, a token is a pointer to (or an address of) the AS security context for the user equipment 215 stored by the base station 210. Tokens are exchanged between user equipment and base stations. The MME 205 is unaware of the token.

In some embodiments, a cookie and a token used by a particular combination of a base station 210 and user equipment 215 may have the same value. For example, an S-TMSI may be used as both the cookie and the token for the security association between base station 210 and the user equipment 215. If the S-TMSI is used for the token and the cookie in a LTE system, the MME 205 sends the S-TMSI as part of a globally unique temporary identifier (GUTI) to the user equipment 215 in an NAS payload that is conveyed via the base station 210 in the Initial Context Setup Request message to the base station 210. Although the base station 210 conveys the NAS payload, the base station 210 does not have access to the corresponding NAS security context and is therefore unable to "see" the contents of the NAS payload. An M-TMSI (which can be derived from the S-TMSI) may also be sent to the base station 210 outside of the NAS payload to serve as the cookie. For subsequent access, the user equipment 215 makes connection requests including S-TMSI and hence S-TMSI could be used as the token to retrieve the AS security context. If the base station 210 finds a valid cached AS security context for the S-TMSI presented, it proceeds transmitting RRC connection messages that are integrity protected using the prior established AS security context, thus implicitly and securely validating the (S-TMSI) token.

The user equipment 215 includes a data structure such as a table 235 for storing tokens and security contexts for the MME 205, the base station 210, as well as other MMEs or base stations that the user may have encountered. The table 235 includes a token provided by each base station such as the base station 210 as part of the negotiation process for establishing the AS security context (AS-SC) for the base station 210 and the user equipment 215. The AS security context may include one or more subordinate keys derived from the security key ($K_{eNB}$) that is shared with the base station 210. The subordinate keys may be used for radio resource control (RRC) encryption and integrity or user plane encryption and integrity. The AS security context may also include other information such as counters for a packet data convergence protocol (PDCP), information indicating an encryption algorithm, identifiers for activated radio bearers, and the like. The table 235 may also include an NAS security context (NAS-SC) that can be used for encryption and integrity protection of communication between the MME 205 and the user equipment 215.

The user equipment 215 may request connectionless service from the base station 210, in which case the AS security context is retained in the base station 210 and the user equipment 215 when the user equipment 215 enters the idle state. Some embodiments of the user equipment 215 may request connectionless service from the base station 210 by providing a connectionless service request message that does not include a token. In response to the token-less connectionless service request message, the base station 210 and the user equipment 215 may negotiate an AS security context and the base station 210 may allocate a token to the negotiated AS security context. The base station 210 may also provide the token to the user equipment 215. The AS security context is retained when the user equipment 215 enters the idle state. The idle user equipment 215 may subsequently request connectionless data transmission by transmitting a request message that includes the token to identify the previously negotiated AS security context. The request for connectionless data transmission may be encrypted using the AS security context. The base station 210 may use the value of the token to identify the AS security context without needing to communicate with the MME 205. Connectionless data transmission may then be performed between the user equipment 215 and the base station 210 using the AS security context while the user equipment 215 remains in the idle state.

Figure 3:
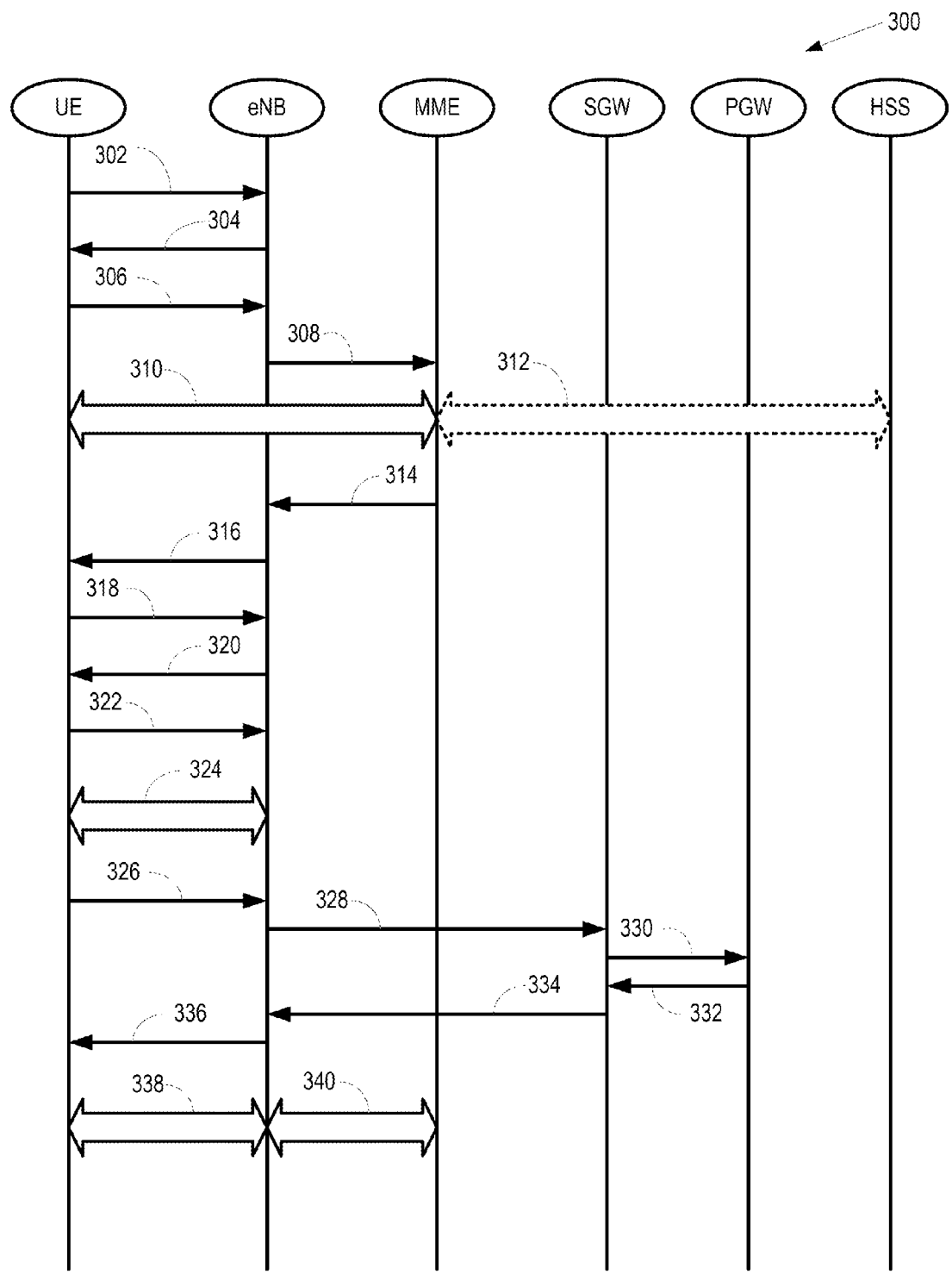
FIG. 3 is a flow diagram of a method of configuring a user equipment (UE) and a base station (eNB) for connectionless service according to some embodiments.

FIG. 3 is a diagram of a method 300 of configuring a user equipment (UE) and a base station (eNB) for connectionless service according to some embodiments. Some embodiments of the method 300 may be implemented by the user equipment 110, the eNB 105, the MME 120, the SGW 130, the PGW 135, and the HSS 125 in the wireless communication system 100 shown in FIG. 1. At 302, the UE sends a request such as an RRC connection request to the eNB, which replies (at 304) with a connection set up message that can be used to configure a radio bearer. At 306, the UE sends a message that indicates that the connection setup is complete. The message also indicates a service request for connectionless service and does not include a token to indicate that this is the initial request. In response to the token-less request for connectionless service, the eNB sends (at 308) a request to the MME for a security key or context that can be used to negotiate an AS security context between the eNB and the UE.

At 310, the UE and the MME negotiate an NAS security context using NAS signaling. For example, a session-specific security context may be negotiated according to the Authentication and Key Agreement (AKA) security protocol using a subscription-specific shared secret key (such as $K_i$) that is known to the UE and the HSS. The session-specific security context in the form of a session-specific secret key $K_{ASME}$ may optionally be provided to the MME by the HSS, as indicated by the dashed arrows at 312. The $K_{ASME}$ can subsequently be used to derive the NAS security context by the MME and the user equipment. However, if the MME has already created a NAS security context for the UE, the MME already has the session specific shared secret key $K_{ASME}$ and does not need to request the shared secret key from the HSS. In this case, AKA authentication between the MME and the UE may be skipped.

At 314, the MME provides an AS security context and a cookie to the eNB. The eNB can use the cookie to identify security contexts that are subsequently negotiated with the UE or have been previously negotiated with the UE and stored on the eNB, as discussed herein. The AS security context includes a key (such as KeNB) that can be used to negotiate the rest of an AS security context for the UE and the eNB. The AS security context may include, but is not limited to, the access stratum security keys associated with user plane and control plane encryption and integrity protection, such as $K_{UPenc}$, $K_{UPint}$, $K_{RRCenc}$, $K_{RRCint}$. At 316, the eNB transmits a security mode command that includes a security algorithm and a token allocated to the AS security context. The token may be integrity protected by the established security association represented by the AS security context. The token may be used to identify the AS security context at the UE or the eNB, as discussed herein. As discussed herein, the token and the AS security context are both cached by the eNB and the UE for the lifetime of the token.

The UE replies that the security mode command is complete at 318. The eNB may then provide an RRC connection reset configuration message at 320 and the UE may reply with an RRC connection reconfiguration complete message at 322.

At 324, a data radio bearer (DRB) has been established and can be used for connectionless data transmission over the air interface. For example, the UE may use the DRB to transmit (at 326) a data packet and a connection identifier over the air interface to the eNB, which may bypass the MME and transmit (at 328) the data packet directly to the SGW for forwarding (at 330) to the PGW and the external PDN. In some embodiments, the UE does not need to transmit (at 326) the token with the small data packet because the UE has not yet transitioned into the idle state after establishing the connectionless service. However, the UE may optionally transmit (at 326) the token with the small data packet. Packets received at the PGW may be forwarded (at 332) to the SGW for transmission (at 334) to the eNB and transmission (at 336) over the air interface to the UE.

The UE transitions to the idle state (at 338) after the data transmission is completed. The eNB informs the MME that the UE has transitioned to the idle state at 340. At this point, the UE has cached the token and the AS security context associated with the eNB. The eNB has also cached the token, the cookie, and the AS security context associated with the UE. The UE may therefore initiate connectionless service by transmitting a connectionless service request with the token. The eNB can then initiate connectionless service without contacting the MME.

Figure 4:
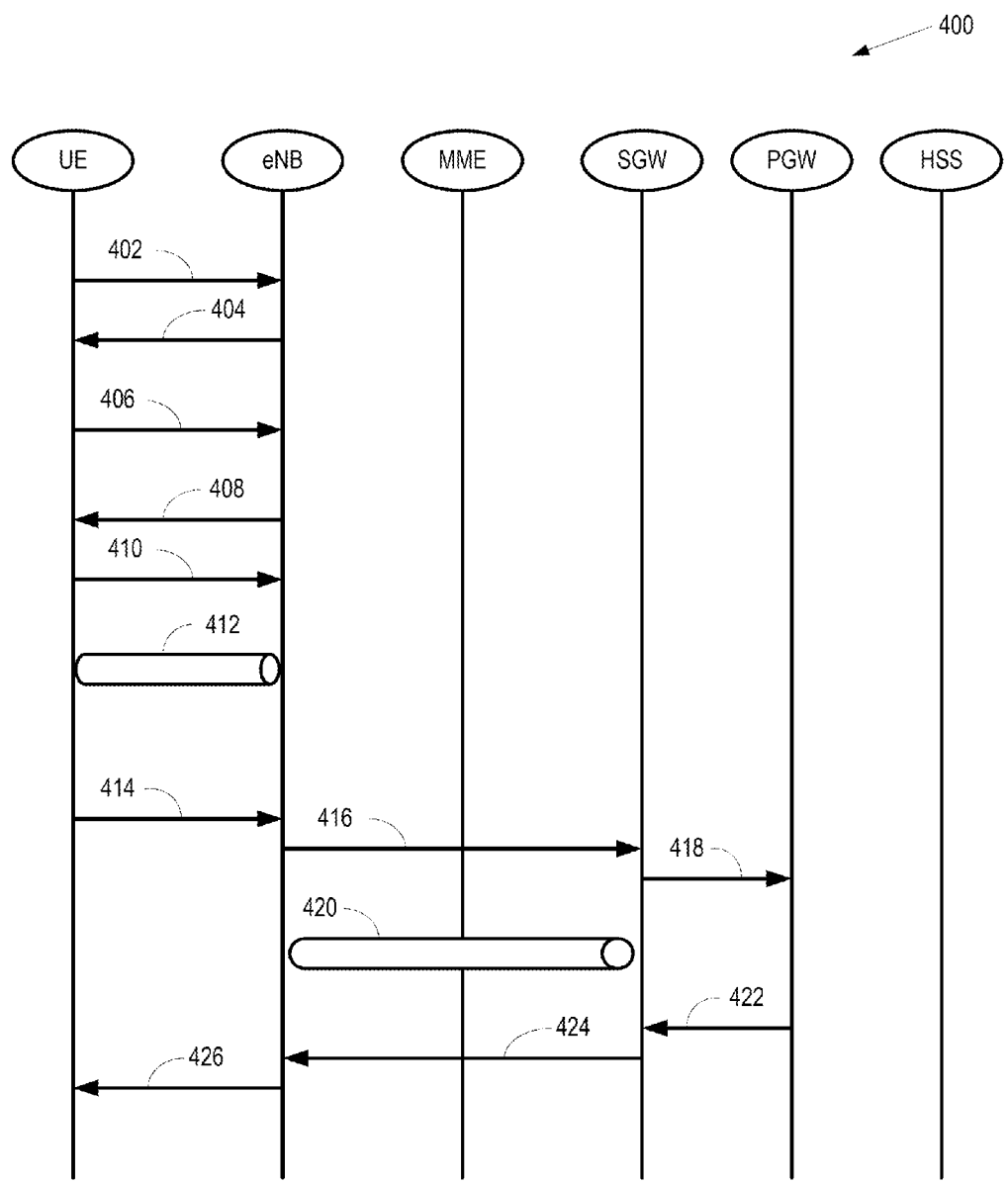
FIG. 4 is a flow diagram of a method of requesting connectionless service and performing connectionless data transfer between an idle UE and an eNB according to some embodiments.

FIG. 4 is a diagram of a method 400 of requesting connectionless service and performing connectionless data transfer between an idle user equipment (UE) and a base station (eNB) according to some embodiments. Some embodiments of the method 400 may be implemented by the UE 110, the eNB 105, the MME 120, the SGW 130, the PGW 135, and the HSS 125 in the wireless communication system 100 shown in FIG. 1. At 402, the idle UE sends a request such as an RRC connection request to the eNB, which replies (at 404) with a connection set up message that can be used to configure a radio bearer. At 406, the idle UE sends a message that indicates that the connection setup is complete. The message also indicates a service request for connectionless service and includes a token to indicate that the idle UE has previously negotiated an AS security context with the eNB, which can be used to provide secure connectionless service without requiring communication with the MME and without transitioning the UE into the active state. Some embodiments of the message may be encrypted based on the previously negotiated AS security context that is cached in the idle UE and the eNB.

The eNB may provide an RRC connection reconfiguration configuration message at 408 and the idle UE may reply with an RRC connection reconfiguration complete message at 410.

At 412, a data radio bearer (DRB) has been established and can be used for connectionless data transmission over the air interface. For example, the idle UE may use the DRB to transmit (at 414) a data packet and a connection identifier over the air interface to the eNB, which may bypass the MME and transmit (at 416) the data packet directly to the SGW. The packet may be transmitted using a previously defined tunnel 418, such as an S1 tunnel between the eNB and the SGW. The packet may then be forwarded (at 420) to the PGW and the external PDN. Packets received at the PGW may be forwarded (at 422) to the SGW for transmission (at 424) to the eNB via the tunnel 418 and transmission (at 426) over the air interface to the idle UE.

Figure 5:
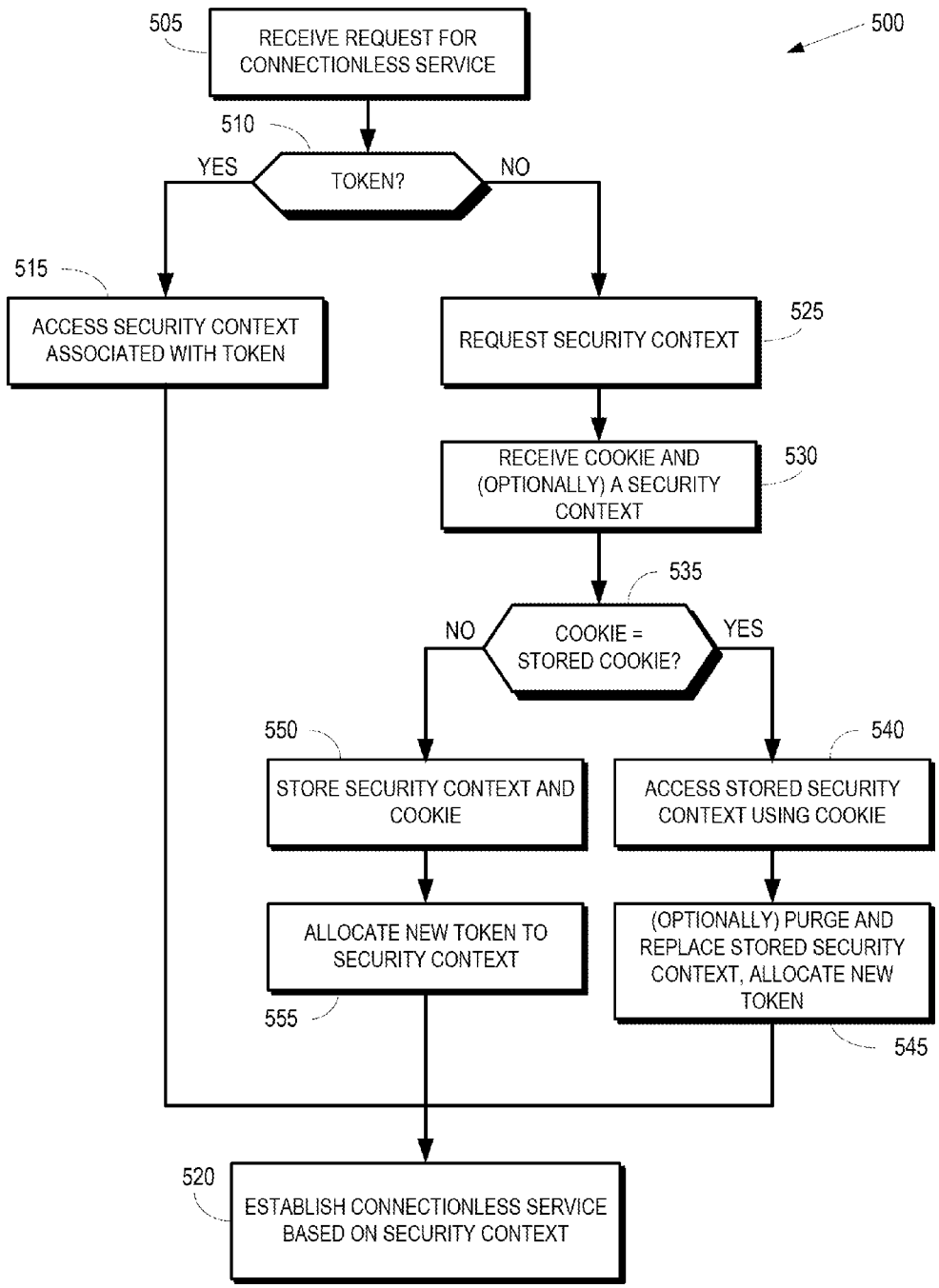
FIG. 5 is a flow diagram of a method for detecting duplicate requests for connectionless service between a user equipment and a base station according to some embodiments.

FIG. 5 is a flow diagram of a method 500 for detecting duplicate requests for connectionless service between a user equipment and a base station according to some embodiments. The method 500 may be implemented in some embodiments of the user equipment 110, the base station 105, or the MME 120 in the wireless communication system 100 shown in FIG. 1 or in some embodiments of the user equipment 215, the base station 210, and the MME 205 shown in FIG. 2. At block 505, the base station receives a request for connectionless service from the user equipment. At decision block 510, the base station determines whether the request includes a token that identifies a cached security context. If so, the base station accesses (at block 515) the security context associated with the token. For example, the base station can use the token as an index into a table that is used to store security contexts for user equipment. Some embodiments of the base station may use the accessed security context to decrypt portions of the request for connectionless service. At block 520, the base station and the user equipment establish the requested connectionless service based on the security context, as discussed herein.

If the base station determines (at decision block 510) that the request for connectionless service does not include a token, which indicates that the user equipment is requesting a new security context with the base station, the base station provides a request for a security context to an MME at block 525. At block 530, the base station may then receive a cookie from the MME and (optionally) a security context associated with the cookie. For example, the MME may use the permanent identity of the requesting user equipment to determine whether the user equipment has previously requested a security context with the same base station. If so, the MME provides the cookie that was previously provided with the previously requested security information so that the base station can identify the existing security context for the user equipment. The MME may also optionally provide new security information, such as a new key ($K_{eNB}$), for refreshing the security context use by the base station and the user equipment. If the user equipment has not previously requested a security context with the same base station, the MME provides a new cookie and new security information to establish the security context for the base station and the user equipment.

At decision block 535, the base station determines whether the cookie received from the MME is the same as a previously stored cookie. If so, the request for connectionless service may be a duplicate (and perhaps fraudulent or malicious) request for connectionless service. Instead of creating a new security context in response to the request, the base station uses the cookie to access the stored security context for the user equipment at block 540. For example, the base station may use the cookie as an index into a table that stores security context information for user equipment that have previously requested connectionless service with the base station. At block 545, the base station may optionally purge and replace the stored security context using new security information provided by the MME. The base station may also allocate a new token to identify the new security context and the token may be provided to the user equipment. At block 520, the user equipment and the base station may establish connectionless service based on the (cached or new) security context.

The request for connectionless service may be a legitimate, non-duplicate request if the base station determines (at decision block 535) that the cookie received from the MME is not the same as any previously stored cookie. The base station may therefore generate and store a new security context (at block 550) based on the security information received from the MME. At block 550, the base station allocates a new token to the security context and the token may be provided to the user equipment. At block 520, the user equipment and the base station may establish connectionless service based on the security context.

Figure 6:
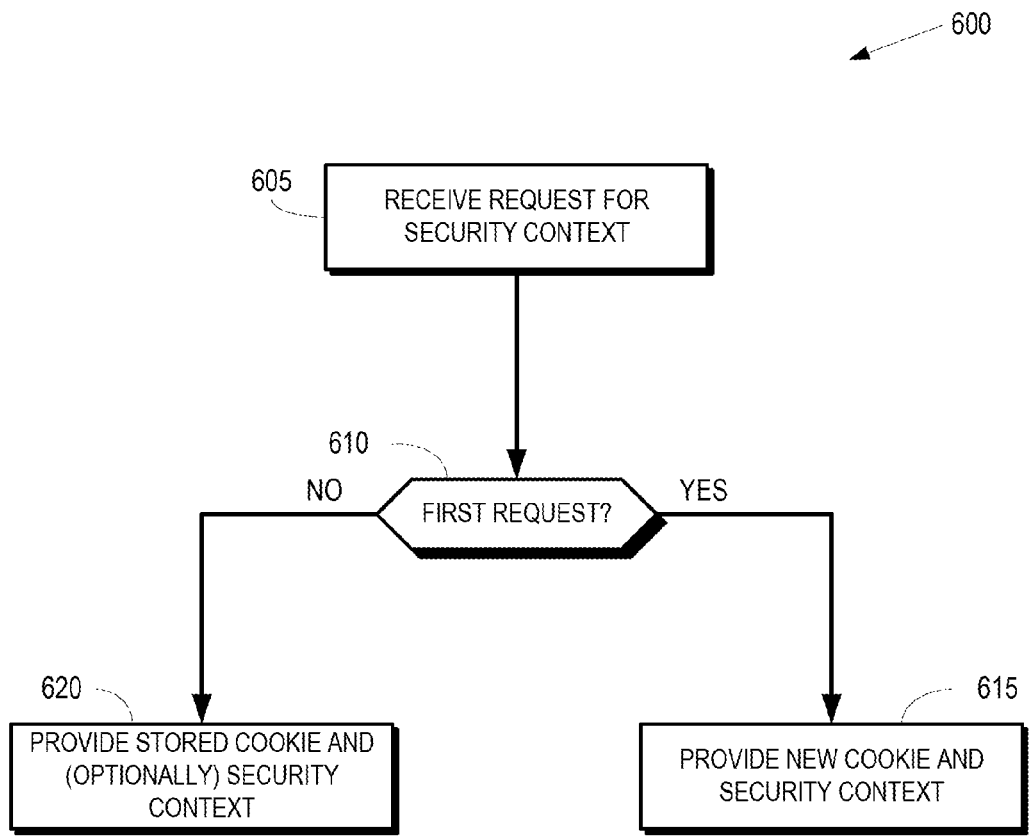
FIG. 6 is a flow diagram of a method for detecting duplicate requests for a security context according to some embodiments.

FIG. 6 is a flow diagram of a method 600 for detecting duplicate requests for a security context according to some embodiments. The method 600 may be implemented in some embodiments of the MME 120 shown in FIG. 1 or in some embodiments of the MME 205 shown in FIG. 2. At block 605, the MME receives a request from a base station for a security context that can be used to support communication between the base station and a user equipment. For example, the base station may request a security key ($K_{eNB}$) that the base station can use to negotiate an AS security context with the user equipment.

At decision block 610, the MME determines whether the request is the first (or initial) request for a security context associated with the base station and the user equipment. For example, the request may include a temporary identifier that the base station uses to identify the user equipment. The MME is able to associate the temporary identifier with the permanent identifier of the user equipment. The permanent identifier may then be used to determine whether the request is the first request, e.g., by using the identifier as an index into a table that includes cookies associated with security contexts cached in base stations. If the request is the first request from the user equipment, the MME allocates a new cookie and provides (at block 615) the new cookie along with the security context to the base station. If the MME determines that the request is not the first request from the user equipment, the MME provides the stored cookie to the base station so that the base station can locate its cached security context for the user equipment. The MME may optionally provide a new security context (which may include a new value of the security key $K_{eNB}$) so that the base station can purge the cached security context and negotiate a new security context with the user equipment.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage). The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    receiving, at a mobility management entity (MME) from a base station, a request for a cookie that identifies a Non-Access Stratum (NAS) security context that is used to establish an Access Stratum (AS) security context for communication between the base station and an idle user equipment in response to the idle user equipment requesting connectionless service to communicate with the base station using a previously established AS security context; and
    in response to receiving the request, transmitting the cookie from the MME towards the base station to identify the AS security context as the previously established AS security context stored by the base station.

2. The method of claim 1, wherein transmitting the cookie comprises transmitting a cookie that is known to the base station and the MME and is unknown to the idle user equipment.

3. The method of claim 2, wherein transmitting the cookie comprises transmitting a cookie that is associated with a permanent identity of the idle user equipment but is different than the permanent identity of the idle user equipment.

4. The method of claim 2, wherein transmitting the cookie comprises transmitting at least one of a cookie that has a random value, a cookie that has an opaque value, or a cookie derived from a second secret key generated by the idle user equipment and a home subscription system (HSS).

5. The method of claim 1, wherein transmitting the cookie comprises transmitting a copy of a cookie that was previously transmitted to the base station in response to the MME determining that the idle user equipment previously requested a first key to establish a first security context with the base station.

6. The method of claim 5, further comprising:
    transmitting the first key and the cookie to the base station.

7. The method of claim 1, further comprising:
    transmitting the cookie and a first key in response to determining, at the MME, that the AS security context has not been established between the idle user equipment and the base station prior to receiving the request for the cookie.

8. The method of claim 7, further comprising:
    determining the first key based on a third key known to the idle user equipment and the MME and unknown to the base station, wherein the third key is used to establish a second AS security context between the idle user equipment and the MME; and storing the cookie and the first key at the MME.

9. A method comprising:

transmitting, from a base station, a request for a cookie that identifies a Non-Access Stratum (NAS) security context that is used to establish an Access Stratum (AS) security context for communication between the base station and an idle user equipment in response to receiving a request from the idle user equipment to initiate connectionless service to communicate with the base station using a previously established AS security context; and in response to transmitting the request, receiving a cookie to identify the AS security context as the previously established AS security context stored by the base station.

10. The method of claim 9, further comprising:

receiving the request from the idle user equipment to initiate the connectionless service with the base station, wherein the request does not include a token to identify the AS security context stored by the base station.

11. The method of claim 9, wherein receiving the cookie comprises receiving a cookie that is known to the base station and a mobility management entity (MME) and is unknown to the idle user equipment.

12. The method of claim 9, wherein receiving the cookie comprises receiving a cookie that is associated with a permanent identifier assigned to the idle user equipment but is different than the permanent identifier assigned to the idle user equipment.

13. The method of claim 9, wherein receiving the cookie comprises receiving at least one of a cookie that has a random value, a cookie that has an opaque value, or a cookie derived from a second secret key generated by the idle user equipment and a home subscription system (HSS).

14. The method of claim 9, further comprising:

using the cookie to identify the AS security context that was previously stored by the base station.

15. The method of claim 14, further comprising:

purging the AS security context that was previously stored by the base station; and renegotiating the AS security context using a first key received with the cookie.

16. The method of claim 9, further comprising:

negotiating the AS security context using a first key received with the cookie when the AS security context was not previously stored by the base station.

17. The method of claim 9, wherein the AS security context is an AS security context comprising a plurality of subordinate keys for radio resource control (RRC) encryption and integrity and user plane encryption and integrity.

18. The method of claim 9, further comprising:

establishing connectionless service with the idle user equipment based on the AS security context and a token associated with the AS security context, wherein the token is known to the idle user equipment and the base station and is unknown to a mobility management entity (MME).

19. The method of claim 18, wherein a value of the token is the same as a value of the cookie.

20. A mobility management entity (MME) comprising: a processor configured to receive, from a base station, a request for a cookie that identifies a Non-Access Stratum (NAS) security context that is used to establish an Access Stratum (AS) security context for communication between the base station and an idle user equipment in response to the idle user equipment requesting connectionless service to communicate with the base station using a previously established AS security context; and a memory to store a data structure to store a cookie that identifies the AS security context as the previously established AS security context stored by the base station, wherein the MME transmits the cookie in response to receiving the request.

21. The MME of claim 20, wherein the cookie is a new cookie generated by the processor.

22. The MME of claim 21, wherein the AS security context is a new AS security context.

23. The MME of claim 21, wherein the processor is configured to generate a new NAS security context for communication between the MME and the idle user equipment.

24. A base station comprising:

a processor to transmit a request for a cookie that identifies a Non-Access Stratum (NAS) security context that is used to establish an Access Stratum (AS) security context for communication between the base station and an idle user equipment in response to receiving a request from the idle user equipment to initiate connectionless service to communicate with the base station using a previously established AS security context; and a memory to store a data structure to store the AS security context, wherein the base station is configured to receive, in response to transmitting the request, a cookie to identify the AS security context as the previously established AS security context.

25. The base station of claim 24, wherein the base station is configured to receive, in response to transmitting the request, a new cookie.

26. The base station of claim 25, wherein the base station is configured to receive, in response to transmitting the request, a new AS security context associated with the new cookie.

27. A user equipment comprising:

a processor to transmit a request for connectionless service to communicate with a base station using a previously established Non-Access Stratum (NAS) security context while the user equipment is in an idle state, wherein the request does not include a token that indicates a corresponding previously established Access Stratum (AS) security context; and a memory to store a data structure to store the previously established NAS security context, the corresponding previously established AS security context, and the token, wherein the user equipment establishes connectionless service with the base station in response to receiving from the base station information related to the previously established AS security context.

28. The user equipment of claim 27, wherein the information includes the token.

29. The user equipment of claim 28, wherein the token is a new token.

30. The user equipment of claim 29, wherein the information further includes a new AS security context.

31. The user equipment of claim 29, wherein the information further includes a new NAS security context.

* * * * *